United States Patent [19]

Hirabayashi et al.

[11] Patent Number: 5,436,674
[45] Date of Patent: Jul. 25, 1995

[54] METHOD OF DETECTING MOTION VECTOR, APPARATUS THEREFOR, AND PICTURE SIGNAL PROCESSING SYSTEM UTILIZING THE APPARATUS

[75] Inventors: Hiroshi Hirabayashi; Yuji Nojiri; Yasuaki Kanatsugu; Shoichi Suzuki; Hajime Sonehara; Junji Kumada; Iwao Obata; Kenji Nakashima, all of Tokyo, Japan

[73] Assignee: Nippon Hoso Kyokai, Tokyo, Japan

[21] Appl. No.: 971,922

[22] PCT Filed: May 22, 1992

[86] PCT No.: PCT/JP92/00659

§ 371 Date: Dec. 21, 1992

§ 102(e) Date: Dec. 21, 1992

[87] PCT Pub. No.: WO92/21210

PCT Pub. Date: Nov. 26, 1992

[30] Foreign Application Priority Data

| May 23, 1991 | [JP] | Japan | 3-146624 |
| May 23, 1991 | [JP] | Japan | 3-146625 |
| Jun. 12, 1991 | [JP] | Japan | 3-166254 |
| Jul. 17, 1991 | [JP] | Japan | 3-201170 |

[51] Int. Cl.⁶ .................................................. H04N 7/137
[52] U.S. Cl. .................................... 348/699; 348/700
[58] Field of Search ............... 358/105, 133, 136; 348/699, 402, 407, 413, 416, 700; H04N 7/137

[56] References Cited

U.S. PATENT DOCUMENTS

| 4,591,907 | 5/1986 | Catros | 348/396 |
| 4,639,767 | 1/1987 | Suzuki | 358/105 |
| 4,668,987 | 5/1987 | Matsuda et al. | 358/136 |
| 4,683,494 | 7/1987 | Furukawa et al. | 348/416 |
| 4,890,160 | 12/1989 | Thomas | 358/136 |
| 4,972,259 | 11/1990 | Motoe et al. | 348/700 |
| 5,008,748 | 4/1991 | Carr et al. | 358/105 |
| 5,018,010 | 5/1991 | Masumoto | 358/138 |
| 5,019,901 | 5/1991 | Uomori et al. | 358/105 |
| 5,083,206 | 1/1992 | Knauer et al. | 358/133 |
| 5,227,880 | 7/1993 | Kim | 358/105 |
| 5,237,413 | 8/1993 | Israelsen et al. | 358/105 |

FOREIGN PATENT DOCUMENTS

| 0333069 | 9/1989 | European Pat. Off. |
| 2648590 | 12/1990 | France |
| 63-181585 | 7/1988 | Japan |

Primary Examiner—Howard W. Britton
Attorney, Agent, or Firm—Antonelli, Terry, Stout & Kraus

[57] ABSTRACT

An apparatus capable of detecting with improved accuracy a motion vector representing an object moved on a picture plane comprises a memory section for storing an input picture signal renewed for every predetermined time interval, a spatial filter section for applying a spatial band limitation to two signal portions of the renewed picture signal stored in the memory, which signal portions corresponding to the different time intervals, and a detecting section including at least one detecting stage for detecting the motion vector in accordance with the gradient method on the basis of the two picture signals and a minute value to be added to a gradient determined from one reference picture signal represented by one of the two picture signals.

19 Claims, 7 Drawing Sheets

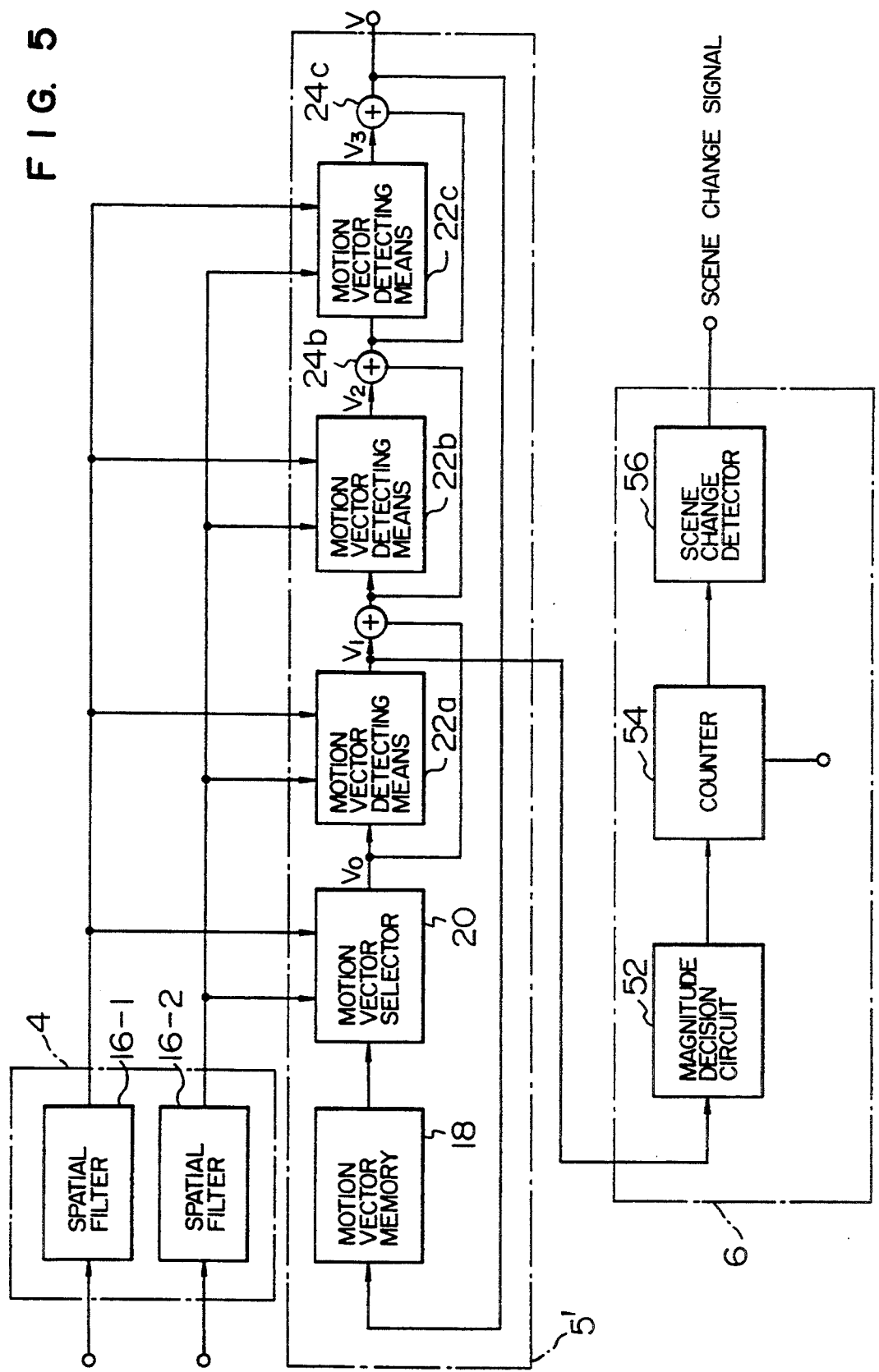

METHOD OF DETECTING MOTION VECTOR, APPARATUS THEREFOR, AND PICTURE SIGNAL PROCESSING SYSTEM UTILIZING THE APPARATUS

TECHNICAL FIELD

The present invention relates to a method of detecting motion of a picture on an image or picture plane as a motion vector from a picture signal by using a gradient method, an apparatus for carrying out the method and a picture signal processing system for performing picture signal processings such as high-efficiency picture signal encoding, frame rate conversion and others by making use of the motion vector as detected.

BACKGROUND ART

There are known a variety of methods for determining the motion vector, of which a technique for detecting a motion vector by using a gradient method will be described by reference to FIG. 3. For simplification of the description, only one dimension corresponding to x-direction will be considered. In FIG. 3, it is assumed that a picture signal 102-1 of an n-th field as indicated by a solid line has moved by Δx to the left from the position of a picture signal 102-2 of an (n−1)-th field indicated by a broken line. In this conjunction, if a field difference, i.e. an inter-field level difference Δt of the picture signal at a pixel point A relative to a same pixel point B can be known together with a spatial differential value, i.e., a value (g=tan θ) on the basis of a gradient at the pixel point A or C, magnitude of the motion of the picture taken place during one field, i.e., the motion vector can be determined. Expressing mathematically, it applies valid that Δx=Δt/tan θ=Δt/g. This is the basic principle underlying the gradient method. At this juncture, it is necessary that the gradient remains same at a pint C corresponding to the point A in order that the above-mentioned expression applies valid perfectly. If the above expression can apply valid as an approximate equation, it is required that the value of Δx be small. In general, however, the motion vector to be determined cannot always be small.

In the foregoing, the gradient method has been described on the basis of the picture signal. Next, a method of determining the motion vector on the basis of pictures as generated on a display screen or a picture plane will be elucidated by reference to FIG. 7. The picture plane is divided into a plurality of blocks with and blocks in the x- and y-directions, respectively.

In the case of the example illustrated in FIG. 7, the display picture plane for display is divided into 16 blocks with 4 blocks in each of the x- and y-directions. An object D0 FIG. 7 displayed within a block 200-33 in a preceding field is displayed as D1 within a block 200-22 in the current field. The motion of the object at this time can be represented by a motion vector V. For detecting this motion vector V, there is generally adopted a block gradient method. According to this block gradient method, a picture plane is divided into a plurality of blocks, wherein a motion vector to a given one of the blocks is determined by using inter-field or inter-frame signal differences at a plurality of pixels belonging to each block.

In other words, the motion vector V can be expressed as follows:

$$\frac{\Sigma \left( \begin{array}{l} \text{inter-field difference of picture signal} \\ \text{at a given pixel} \end{array} \right) \times \text{(sign of gradient)}}{\Sigma \text{ (absolute value of picture signal)}} \quad (1)$$

Let's consider an x-directional component and a y-directional component of a motion vector on an assumption that K pixels exist in each block. When representing by $\Delta t_i$ an inter-field picture signal difference between the preceding field and the current field at an i-th pixel and representing by $g_{xi}$ and $y_i$ the gradients in the x- and y-directions at the i-th pixel in the current field, respectively, the x-component $V_x$ and the y-component $V_y$ of the motion vector V can be expressed as follows:

$$V_x = - \frac{\sum_i \Delta t_i \cdot \text{sign}(g_{xi})}{\sum_i |g_{xi}|} \quad (2)$$

$$V_y = - \frac{\sum_i \Delta t_i \cdot \text{sign}(g_{yi})}{\sum_i |g_{yi}|}$$

where symbol Σ indicates summation for all the pixels within a given block. Once the x-component and the y-component have been determined, the motion vector V of a two-dimensional picture can easily be determined.

As described previously, when the motion vector V of a television picture is to be determined by the gradient method, a spatial band limitation is applied to the picture signal so that the picture signal has a same gradient at one and the same place between different fields or frames with a view to increasing detection accuracy. Further, when an interlaced television signal is to be processed by the gradient method, those signal components which are modulated and folded back by an interlacing carrier are diminished through a sequential scanning. In this conjunction, the circuit for the sequential scanning performs generally an intra-frame processing for a still picture portion while performing an intra-field processing for a motion picture portion.

Elucidation will now be made of signal waveforms making appearance when the spatial band limitation is applied to an input picture signal. In FIG. 4A, there are illustrated light signals impinging into a TV camera at a field interval. In this figure, a solid line, a broken line, a single-dot line, a double-dot line and a triple-dot line represent signals at an n-th field, (n+1)-th field, (n+2)-th field, ((n+3)-th field and an (n+4)-th field, respectively. As can be seen in the Figure, a rising portion of the edge moves toward the right. With a conventional TV camera, an output signal therefrom will be of such waveform as illustrated in FIG. 4B because of accompaniment of a storage effect. In the case of the signal shown in FIG. 4B, there exists no area in which picture signals of different fields overlap each other at same pixels on a picture plane, differing from the example illustrated in FIG. 3, which means that the conditions for validating the gradient method mentioned above are not fulfilled. Accordingly, without any modification, it is impossible to apply the gradient method. Under the circumstances, the spatial band limitation has heretofore been performed on the picture signal in an effort to increase the overlap area or region. A picture signal waveform resulting from the spatial band limitation is illustrated in FIG. 4C. By performing the spatial band limitation, coincidence can be established to some extent as to a range of computation points at which the motion vector is to be determined. However, the spatial band limitation alone has not always been sufficient for determination of the motion vector but often provided a cause for degradation in the detection accuracy of the motion vector because of presence of such rising portions of the edges in which no overlap is found, as can be seen in FIG. 4C.

Besides, in the case of the prior art block gradient method, the denominator of the expressions (1) and (2), i.e. the sum of absolute gradient values, assumes a value approximating to zero in a region where the gradient is small, as is obvious from the expressions (1) and (2). As a consequence, the value of the detected motion vector becomes significantly greater than the true or intrinsic motion vector value, thus presenting a problem that remarkable error is involved.

For making decision as to whether a motion vector determined by a given method is appropriate or not, it has heretofore been general to use an inter-frame difference between a picture moved on the basis of the motion vector and a picture actually moved. This is because the inter-frame difference becomes minimum when the motion vector has an optimal value, representing coincidence between the two pictures mentioned above. The decision as to the appropriateness of the motion vector as determined has heretofore been made by making use of the fact mentioned above. For the motion vector detection, a rigid object motion is presumed, wherein the motion vector is determined on the basis of relation between two or more pictures. More specifically, when a picture within a block of concern on a picture plane or screen displaying a motion picture is moving uniformly, i.e., when all the pictures appearing within that block have a same motion vector, the inter-frame difference between the pictures moved on the basis of that motion vector will become zero unless perturbation or fluctuation due to spurious noise or the like is taken into consideration. In actuality, however, because of the influences of change in luminance, presence of a boundary between a moving object and a still portion, within a block or the like the uniform picture motion can not always be expected. Additionally, an occlusion problem and uncovered background problem contribute to occurrence of significant inter-frame difference, making it difficult to decides whether the motion vector as determined is optimal or not. On the other hand, there may arise such situation in which the inter-frame difference decreases notwithstanding of the fact that the picture shifted based on the motion vector includes a portion which differs from the original picture. Thus, it is not always safe to say that the hitherto known motion vector detection method based on the inter-frame difference is to be appropriate or satisfactory.

Heretofore, detection of a scene change in a television picture is carried out in such manner that inter-frame or inter-field differences in the picture signals is determined over a plurality of regions on a picture plane, wherein when the difference exceeds a certain threshold value, motion of the picture is decided, and when the regions for which the motion of the picture is decided exceeds a certain proportion of one scene, the scene change of the picture is detected. With the hitherto known method of detecting the scene change in the television picture, the scene change occurring in the picture can certainly be detected with high reliability. However, the scene change detecting method is disadvantageous in that upon appearance of many picture signals representing motion in a scene due to panning and tilt, the scene change is detected erroneously.

DISCLOSURE OF THE INVENTION

In, the light of the state of the art described above, an object of the present invention is to provide an apparatus which is capable of detecting with an improved accuracy a motion vector representing a motion of an object moved on a picture plane.

Another object of the present invention is to provide a picture or image signal processing system in which the motion vector detecting apparatus mentioned above is employed.

For achieving the above objects, a motion vector detecting apparatus according to the invention comprises a memory section for storing an input picture signal renewed at every predetermined time interval, a spatial filter section for applying a spatial band limitation to two signal portions of the renewed picture signal stored in the memory, which signal portions corresponding to the different time intervals, and a detecting section including at least one detecting stage for detecting the motion vector in accordance with the gradient method on the basis of the two picture signals and a minute value to be added to a gradient determined from one reference picture signal represented by one of the two picture signals.

According to the invention, the input picture signal is added with an electrically generated after-image or residual image so as to be temporally equivalent to a picture signal undergone an LPF (low-pass filter) processing, as a result of which a region of the picture signal in which the gradient remains the same between the fields or frames is enlarged to improve accuracy in detecting the motion vector by the gradient method.

In the prior art block gradient method, components of the detected vector exhibit significantly large values when compared with the intrinsic vector value in the region of the picture signal where the gradient is small, giving rise to erroneous vector detection. In contrast, according to the present invention which teaches addition of a minute value to the gradient, the detected vector can assume a value approximating to zero in the region where the gradient is small without exerting any appreciable influence to the region the where the gradient is large. By applying the method according to the invention to a hitherto known block gradient method in which an initial displacement vector is made use of, the displacement vector can assume a value close to zero under the influence of the minute value (value of a dither signal) in the region where the gradient is small. Since the detected vector assumes a value close to that of the initial displacement vector, the value of the motion vector can be calculated correctly so long as the initial displacement vector is determined correctly.

Furthermore, according to the present invention, reliability of the detected motion vector of a picture is not determined on the basis of an inter-frame difference between two corresponding picture signals but determined on the basis of a value obtained by standardizing a distance on a N-dimensional coefficient space realized through an orthogonal expansion of one-dimensional or two-dimensional functions representing the picture. By virtue of this aspect, reliability of decision as to appropriateness of the motion vector as determined can be enhanced over the prior art method. Besides, degree of similarity between two pictures undergoing the comparison can be displayed quantitatively.

Additionally, according to the present invention, detection of scene change is effectuated by adopting a method of determining the motion vector of a picture by a recursive block gradient method which is based on the use of the initial displacement vector and by evaluating the number of sub-blocks of the picture plane where magnitude of the displacement vector determined by a first or initial gradient method exceeds a first threshold value. By virtue of this feature, erroneous detection of the panning, tilting or the like as the scene changes can be suppressed, whereby the scene change can be detected with high reliability.

BRIEF DESCRIPTION OF THE DRAWINGS

FIG. 5 is a diagram showing a motion vector detecting apparatus according to a modified embodiment of the invention which apparatus is capable of detecting not only a motion vector but also a scene change by adopting a recursive block gradient method;

DESCRIPTION OF THE PREFERENCE EMBODIMENTS OF THE INVENTION

In the following, a motion vector detecting apparatus according to the present invention will be described in detail by reference to the accompanying drawings.

Figure 1:
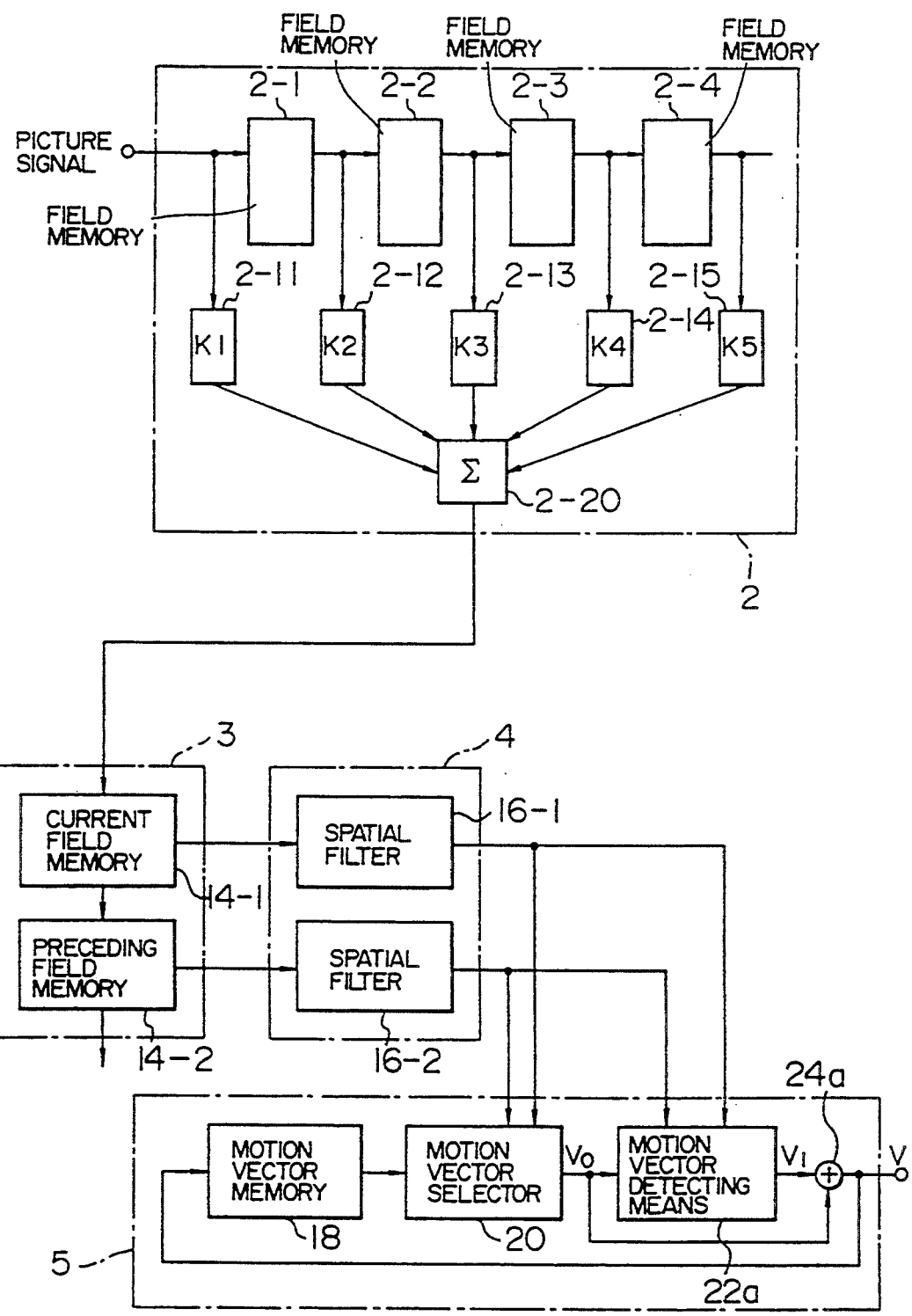
FIG. 1 is a diagram showing a motion vector detecting apparatus in which a gradient method is adopted.

At first, referring to FIG. 1, description will be made of a structure of a motion vector detecting apparatus according to the invention. The motion vector detecting apparatus includes a temporal band limiter section 2, a field memory group section 3, a spatial band limiter section 4 and a detecting section 5. The band limiter section 2 destined to apply a temporal band limitation to an unprocessed or reference picture signal as inputted includes four field memories 2-1 to 2-4 for storing sequentially picture signals each of one field, respectively, five scalers 2-11 to 2-15 for weighting the picture signals outputted from the field memories 2-1 to 2-4, respectively, and a summing circuit 2-20 for adding together the signals weighted by the scalers 2-11 to 2-15. The field memories 2-1 to 2-3 transfer the picture signals stored therein to the adjacent field memories 2-2 to 2-4, respectively, on a field-by-field basis. The field memory 2-1 stores the input picture signal, while the picture signal stored in the field memory 2-4 is used for other purpose.

The field memory group section 3 for storing the output signals from the limiter section 2 as temporally filtered picture signals includes a current field memory 14-1 for storing the temporally filtered picture signal of the current field and a preceding field memory 14-2 for storing the temporally filtered picture signal of the preceding field. The signal stored in the current field memory 14-1 in the current field is stored in the preceding field memory 14-2 in the succeeding field. The spatial band limiter section 4 includes spatial filters 16-1 and 16-2 for spatially filtering the picture signals stored in the current field memory 14-1 and the preceding field memory 14-2, respectively.

The detecting section 5 for detecting the motion vector includes a motion vector memory 18 for storing the motion vectors detected already, a motion vector selector 20 for selecting one of the motion vectors stored in the memory 18 as a motion vector $V_0$ in accordance with the output signals from the filters 16-1 and 16-2, a motion vector detecting stage 22a for detecting a motion vector $V_1$ from the output signals of the filters 16-1 and 16-2 by using the motion vector $V_0$ from the selector 20 and an adder $24_a$ for generating a motion vector V from the motion vectors $V_0$ and $V_1$.

Next, operation of the motion vector detecting apparatus according to the present invention will be described in detail.

According to the invention, there is provided the temporal band limiter section 2 in a stage preceding to the sections 3, 4 and 5 operative on the basis of the gradient method. The aim of this limiter section 2 is to generate electrically an after-image (residual image) effect of a TV camera for the purpose of enlarging an overlap region in the picture signals of different fields or frames which region has ideally a same gradient. In FIG. 1, there is illustrated, by way of example, the limiter section 2 realized in the form of a temporal filter having five taps by using four field memories 2-1 to 2-4. Coefficients k1 to k5 of the scalers 2-11 to 2-15 represent tap coefficients of the five-tap filter.

Figure 4A:
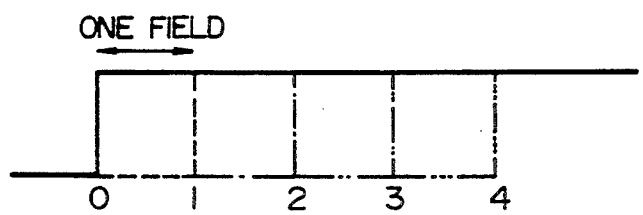
FIGS. 4A to 4D are views for illustrating applicability of the gradient method by effecting a temporal band limitation for picture signals over a plurality of fields.
Figure 4B:
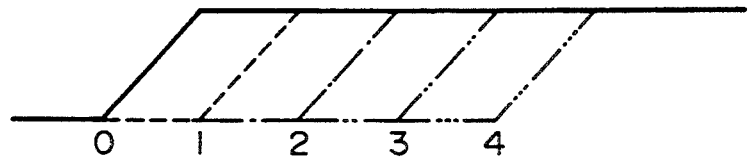
Figure 4C:
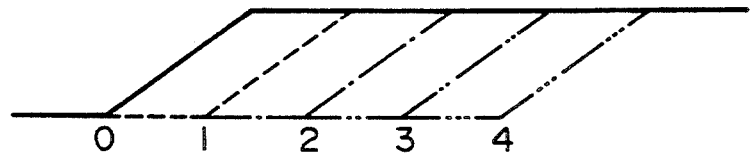
Figure 4D:
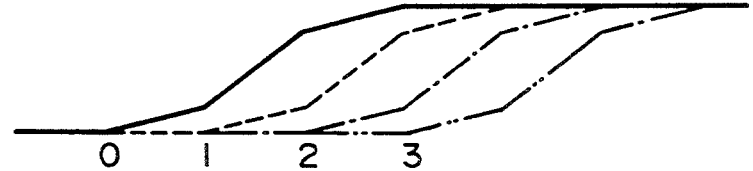

According to the gradient method, it is required for detecting accurately the motion vector that the gradient of the picture signal subjected to the detection remains coincident or throughout the fields. In the case of the picture signal shown in FIG. 4A, the gradient method can not be used. In a television camera in which an image pickup tube is employed, the rising portion of the edge of the picture signal has a gradient owing to a storage effect, as is shown in FIG. 4B. In the case of a practical television camera, the gradient of the rising edge portion will be more gentle due to presence of the after-image effect as well, meaning that the region in which the gradient method can be used increases. In other words, in the gradient method, the motion vector is detected by making use of the storage effect and the after-image effect of the television camera.

With the after-image effect of the television camera, a part of the picture signal of the preceding field is added to that of the current field. However, the picture signal of the current field can never affect that of the preceding field. In a television camera where a CCD (Change-Coupled Device) is used, the after-image effect is insignificant. Moreover, when a shutter is inserted, the storage effect also decreases. In that case, characteristics of the temporal band limiter section 2 or the temporal filter provided according to the invention is adjusted in dependence on magnitude of the storage or after-image effect of the television camera as used to thereby generate electrically the storage or after-image effect.

Description will now turn to a method of determining the coefficients k1 to k5 for achieving the object mentioned hereinbefore. In the case of the television camera in which an image pickup tube is used, a picture of the preceding field will temporally remain as an after-image. In that case, the after-image effect can be obtained by adding electrically a picture of the temporally succeeding field. On the other hand, in the case of the CCD type television camera in which the after-image is very insignificant, the after-image can be generated by using pictures of the temporally preceding and succeeding fields. To say in another way, a part of the picture signal in the preceding field may be added to the picture signal of the current field. In dependence on the amount to be added, relation among the coefficients k1 to k5 can be determined.

By way of example, let's consider a filter structure for the picture signal of a television camera in which an image pickup tube is used. Since a picture stored in the preceding field remains in the picture of the succeeding field, a part of the picture signal succeeding to that of the current field by one field is added to the picture signal preceding to the current field by one field in order to make symmetrical the preceding and succeeding picture images relative to the current field. The coefficient to this end is selected to be $\frac{1}{2}$. Assuming that the effects of the after-images one field before and two field before, respectively, have influence to the picture signal of the current field even though it depends on the type of the television camera, parts of the picture signals obtained one field after and two fields after, respectively, are added to the picture signals obtained one field before and two field before, respectively. In this case, the coefficient is selected to be $\frac{1}{8}$ for the picture signal obtained one field before while selected to be 1/64 for the picture signal obtained two fields before. As a result of this, the coefficients of the scalers 2-11 to 2-15 are as follows on the assumption that the coefficient for the current field is 1 (unity).

$$k1 = 0, k2 = 0, k3 = 1,$$

$$k4 = 5/8 \left( = \frac{1}{2} + \frac{1}{8} \right), k5 = 1/64$$

In the foregoing description, it has been assumed that four field memories are used. However, the invention is not restricted to such configuration. Besides, the field memories may be replaced by frame memories. Although it has been described that the coefficients of the scalers are previously determined in consideration of the type of the television camera as used, it should be understood that these coefficients may dynamically be determined in accordance with the motion vector as detected or overlap region. Modifications to this end will readily occur to these skilled in the art.

Next, operation of the sections 3, 4 and 5 will be described. The picture signal outputted from the summing unit 2-20 is stored in the current field memory 14-1 of the section 3. The picture signal stored in the current memory 14-1 is transferred to the preceding field memory 14-2 in precedence to the storage of the picture signal outputted from the summing unit 2-20. The picture signals stored in the memories 14-1 and 14-2 are supplied to the spatial filters 16-1 and 16-2, respectively, of the section 4 to undergo spatial band limitation. The band-limited picture signals are supplied to a motion vector selector 20 and the motion vector detecting stage 22a of the section 5.

In the block gradient method, the display picture plane is divided into a plurality of blocks each having a plurality of pixels. Before calculating the motion vector in each block, the selector 20 selects an initial displacement vector relative to a concerned block of the current field from the motion vector memory 18.

A method of selecting the initial displacement vector will be elucidated below. Let's represent by B the concerned block and by $B_0$ a block located in the preceding field at a position on the display picture plane which corresponds to the block B. In this conjunction, it is assumed that the motion vectors of the individual blocks of the preceding field have already been determined at the time when the motion Vector of the concerned block in the current field is to be detected and that the motion vectors of those blocks of the current field which precede to the concerned block B has also been determined. Parenthetically, it is to be noted that the following description holds true even when the term "field" is replaced by "frame". A predetermined number of candidates for the motion vector are selected from the motion vector of the block $B_0$ located in the preceding field at the position corresponding to the concern block B of the current field, the motion vectors of the blocks surrounding the block $B_0$ and the motion vectors detected already for the blocks belonging to the current field. For each of these selected candidates for the motion vector, a block of a same size as the block $B_0$ is set in the preceding field at a position to which the block $B_0$ of the preceding field has been displaced in correspondence to the motion vector thereof, and then a pattern matching is performed between the set block and the concerned block B. The motion vector for a block $B_1$ exhibiting the best pattern matching is then selected as the initial displacement vector $V_0$ which is supplied to the detecting stage 22a and the adder 24a.

Figure 2:
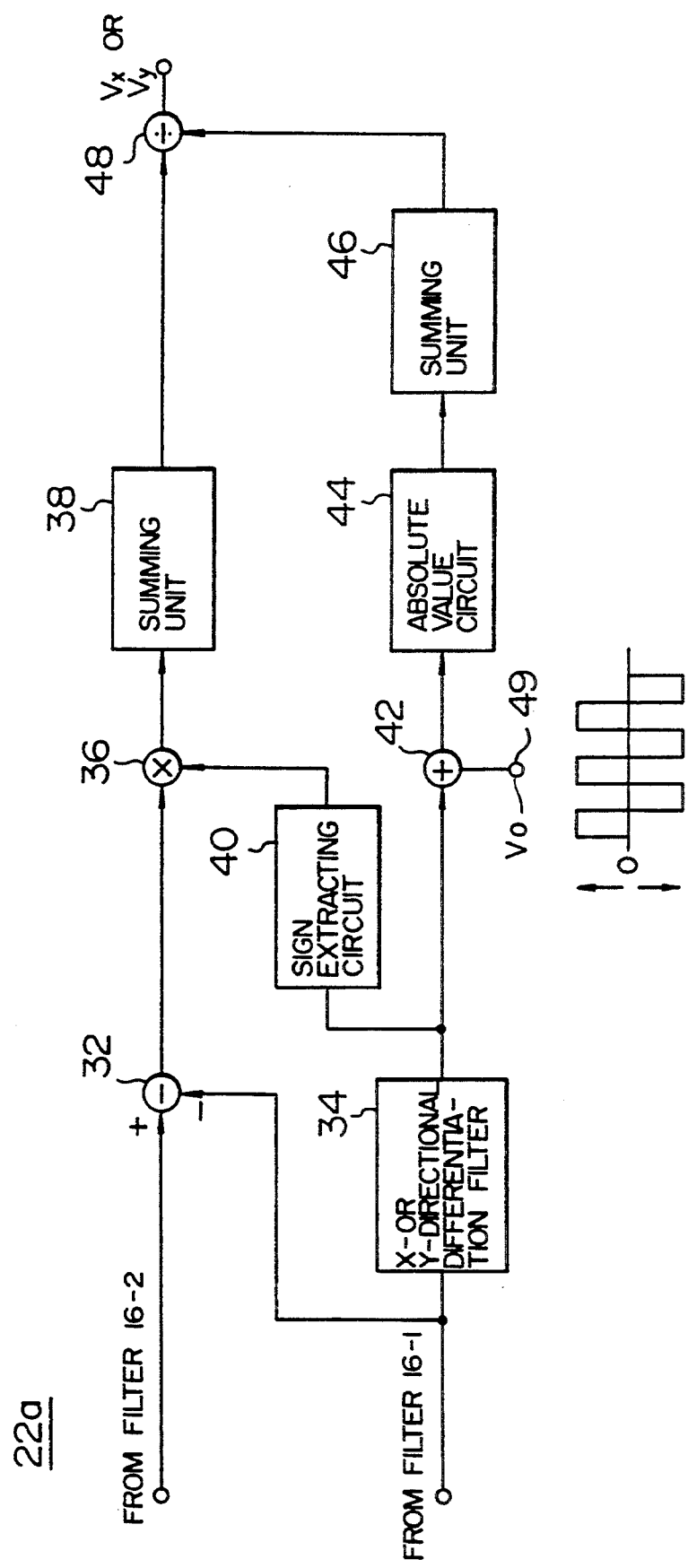
FIG. 2 is a diagram showing a structure of a detecting stage incorporated in a motion vector detecting section shown in FIG. 1.
Figure 3:
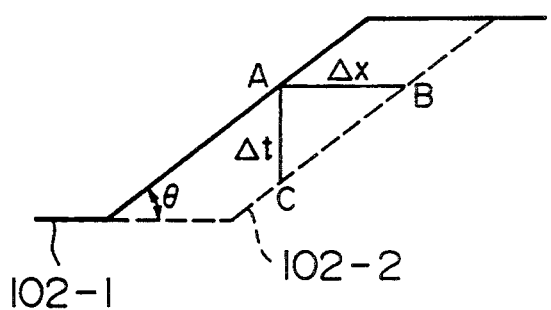
FIG. 3 is a view for illustrating the principle of a gradient method.

As is shown in FIG. 2, the detecting stage 22a includes for individual components of the motion vector a subtraction unit 32, an x- or y-differentiation filter 34, a multiplier 36, a summing unit 38, a sign extracting unit 40, an adder 42, an absolute value circuit 44, a summing unit 46, a divider 48 and a dither signal generator 49. For an x-directional component $V_x$, for example, the current field picture signal from the filter 16-1 is supplied to the differentiation filter 34 and the subtraction unit 32, while the preceding field picture signal from the filter 16-2 is supplied to the subtraction unit 32. The differentiation filter 34 differentiates the current field picture signal to thereby determine gradient values $g_{xi}$ of the current field picture signal at the individual pixels i within the concerned block. The gradient values are then supplied to the adder 42 and the circuit 40. In the circuit 40, sign of the gradient value is extracted to be outputted to the multiplier 36. The subtraction unit 32 subtracts the current field picture signal from the preceding field picture signal for each of the pixels within the concerned block and outputs differences $\Delta t_i$ resulting from the subtraction to the multiplier 36, which codes the values $\Delta t_i$ on the basis of the sign signal supplied from the circuit 40, the coded values being outputted to the summation unit 38. The summation unit 38 sums the outputs of the multiplier 36 for all the pixels of the concerned block.

The adder 42 which is supplied with a minute dither signal from the dither signal generator 49 adds the gradient values gxi with a value S of the dither signal, the result of the addition being outputted to the circuit 44, which then determines the absolute value of the output from the adder 42, the result of which is outputted to the summation unit 46. In the summation unit 46, the outputs from the circuit 44 are summed for all the pixels of the concerned block. Upon completion of the summation processing for all the pixels within the concerned block, the divider 48 divides the output of the summation unit 38 by that of the summation unit 46, the result of which is outputted as a value $V_x$ or $V_y$ of one component of the motion vector V.

The detected vector $V_1$ is supplied to the adder 24a to be added with the initial displacement vector $V_0$, as a result of which the motion vector V of the concerned block in the current field can be determined. This motion vector is stored in the motion vector memory 18.

As is apparent from the above, the components $V_x$ and $V_y$ of the motion vector V can be expressed as follows:

$$V_x = -\frac{\sum_i \Delta t_i \cdot \text{sign}(g_{xi})}{S_x + \sum_i |g_{xi}|} \quad (3)$$

$$V_g = -\frac{\sum_i \Delta t_i \cdot \text{sign}(g_{yi})}{S_y + \sum_i |g_{yi}|} \quad (4)$$

where $S_x$ and $S_y$ represent $$\sum_i S,$$

value which makes appearance owing to the addition of the dither signal on the block basis and assumes different magnitudes in dependence on the types of the pictures.

Influence or contribution of the sums $S_x$ or $S_y$ of the dither signal value is zero or approximates closely to zero in a region where the gradient is of large magnitude. However, as the gradient becomes smaller, the contribution of the sum $S_x$ or $S_y$ previously increases in the relative sense. More specifically, values of the x-component $V_x$ and the y-component $V_y$ of the motion vector V given by the expressions (3) and (4), respectively, are insusceptible to the influence due to addition of the dither signal in a region where the gradient is of large magnitude, while the values of these vector components become smaller in the region where the gradient is of small because the values of denominators in the expressions (3) and (4) increases.

The method of adding the dither signal value to the gradient is more effective for the detection of the motion vector by the gradient method using the initial displacement vector $V_0$. Assuming that a vector close to the intrinsic motion vector is selected as the initial displacement vector $V_0$, the method in which addition of the dither signal to the gradient signal is not adopted will involve significant error in the detected displacement vector $V_1$ because the components $V_{x1}$ and $V_{y1}$ of the displacement vector $V_1$ determined from the expression (2) assume significantly large values in a region where the gradient is small. In contrast, according to the method in which the dither signal value is added to the gradient, the components $V_{x1}$ and $V_{yl}$ are close to zero even in the region of small gradient, thus ensuring that the displacement vector $V_1$ as detected can assume a value approximating to the initial displacement vector $V_0$, whereby possibility of occurrence of significant error can positively be excluded.

As is apparent from the foregoing elucidation, the temporal band limiter section is not always indispensably required but may be spared so long as the reference picture signal can provide sufficiently high storage and after-image effects. Of course, the picture signal may be processed on a frame-by-frame basis instead of the field-by-field basis. In the case of the instant embodiment, the initial displacement vector is supplied to the detecting stage 22a from the selector 20. However, the motion vector memory 18 and the selector 20 may be spared. In that case, the vector $V_1$ detected in the detecting stage 22a represents the motion vector V.

In the case of the illustrated embodiment, the absolute value is determined after addition of the dither signal. However, it is equally conceivable to add the dither signal after determination of the sum of the absolute gradient values.

After the displacement vector $V_1$ has been detected for the block $B_1$ as described above, a block $B_2$ displaced or deviated from the block $B_1$ by the vector $V_1$ is now set in the preceding field, and a displacement vector $V_2$ is determined between the picture signals of the block $B_2$ and B in accordance with the block gradient method. In this way, this processing is sequentially and recursively performed until the displacement vector converges to zero. However, in practice, instead of executing the processing recursively until the displacement vector has converged to zero exactly in a strict sense, the processing is terminated after an appropriate number of the repetitions or when magnitude of the displacement vector has decreased below a preset threshold value. The rate of convergence is usually so high that three times as many as execution of the arithmetic operation according to the recursive block gradient method will be sufficient, as can be seen from FIG. 5.

Next, description will be made of a recursive block gradient method which realizes the concept elucidated above. This method can be realized with the structure shown in FIG. 5. It should however be understood that the basic structure to this end is similar to that shown in FIG. 1 except for a difference in that additional motion vector detecting stages 22b and 22c are provided in addition to the motion vector detecting stage 22a in the case of the arrangement shown in FIG. 5. Each of the detecting stages 22b and 22c is implemented in a configuration similar to that of the detecting stage 22a. The detecting stages 22a, 22b and 22c are connected in series to one another, wherein a displacement vector is supplied from the preceding stage to the succeeding one with the initial displacement vector being supplied to the leading stage. The motion vector detected finally is stored in the memory 18.

In the case of this modified embodiment, the displacement vector $V_1$ is supplied to a scene change detecting stage 6 which includes a magnitude decision circuit 52, a counter 54 and a scene change detector 56. The displacement vector $V_1$ outputted from the detecting stage 22a is supplied to the circuit 52 where magnitude of the displacement vector $V_1$ is compared with a first predetermined value. When magnitude of the displacement vector $V_1$ is greater than the first predetermined value, the content of the counter 54 is incremented by "1". This processing is executed for the whole field, i.e., for all the blocks of the picture plane. Upon completion of the processing for one field, the count value at that time point is outputted to the detector 56, which then makes decision as to whether or not the count value as inputted is greater than a second predetermined value. When it is decided that the count value is greater than the second predetermined value, this means that occurrence of a scene change is detected, whereby a scene change signal is outputted.

With the configuration shown in FIG. 5, there 10 are stored successively in the motion vector memory 18 the motion vectors detected for a large number of blocks in the prepreceding field, preceding field and/or the current field. These motion vectors are used as the candidate vectors for determining the initial displacement vector of a concerned block which is to be determined. Subsequently, the initial displacement vector $V_0$ is selected from the above-mentioned candidate vectors by the initial displacement vector selector 20. Succeeding recursive block gradient arithmetic stages 22a, 22b and 22c are each implemented in a configuration similar to the arithmetic stage 22a operating in accordance with the block gradient method described previously. Thus, the motion vector of the block in the current field to be finally determined is given by $$V = V_0 + V_1 + V_2 + V_3$$

The motion vector detecting method based on the recursive block gradient method using the initial displacement vector will now be understood from the foregoing.

In the case of the embodiment described above, a minute signal is added to the gradient signal in each stage. It should however be understood that the motion vector detecting stage known heretofore may be employed. In that case, accuracy of the motion vector as determined can be enhanced.

As described previously, for the detection of the scene change, the very motion vector detecting method elucidated above is utilized. In the case of the ordinary pictures except for that of the scene change, the initial displacement vector $V_0$ is selected at a value approximating to the intrinsic vector value. Consequently, the displacement vector $V_1$ determined through the initial arithmetic processing based on the gradient method often assumes a smaller value. On the other hand, the scene change differs from the picture in which an object or objects are moving. Accordingly, it is meaningless to determine the motion vector itself. Nevertheless, if it is presumed to determine the motion vector at any rate, there will be selected some vector as the initial displacement vector $V_0$ through pattern matching, and the displacement vector $V_1$ will exhibit a tendency to assume a large value.

Parenthetically, an output signal representing occurrence of a scene change may be produced at the time point when the coefficient value for one field or one frame exceeds a second predetermined value in the scene change detector 56. The second predetermined value may be given in terms of a certain ratio to a total number of the blocks in one picture plane or scene.

Figure 6:
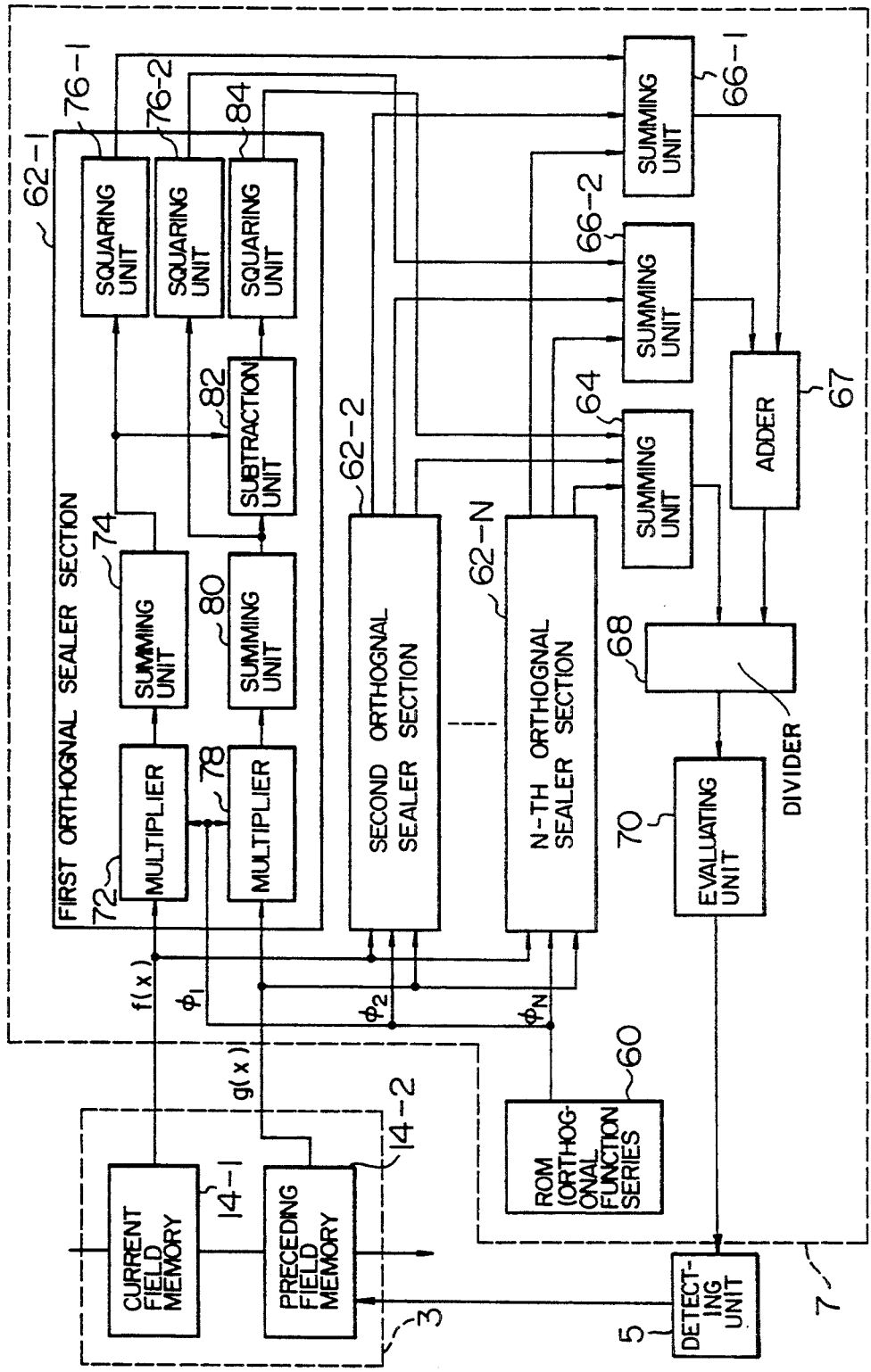
FIG. 6 is a diagram showing a reliability decision circuit incorporated in the motion vector detection apparatus according to the invention for making decision as to reliability of the motion vector as detected.
Figure 7:
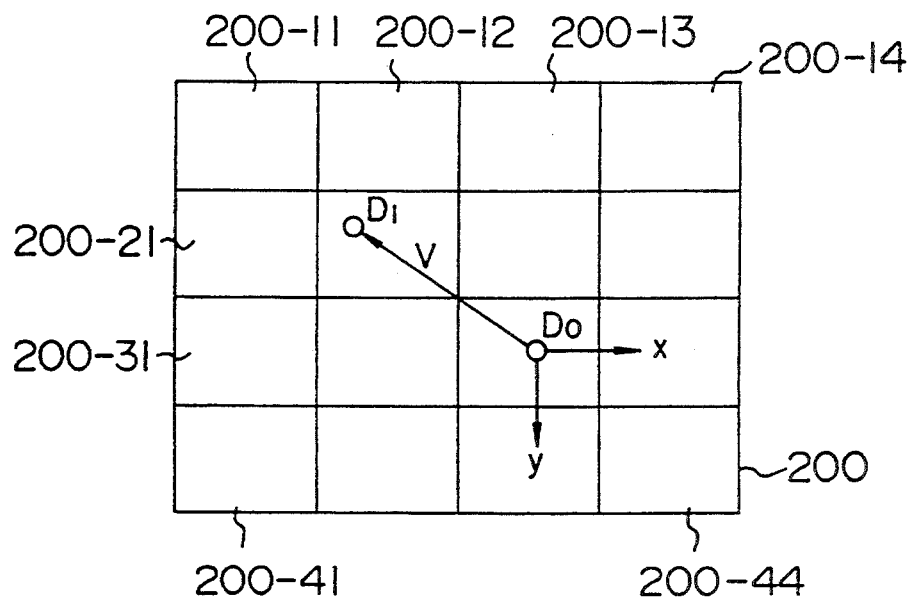
FIG. 7 is a view for illustrating a motion vector of an object displayed on a picture plane and application of a gradient method.
Figure 8:
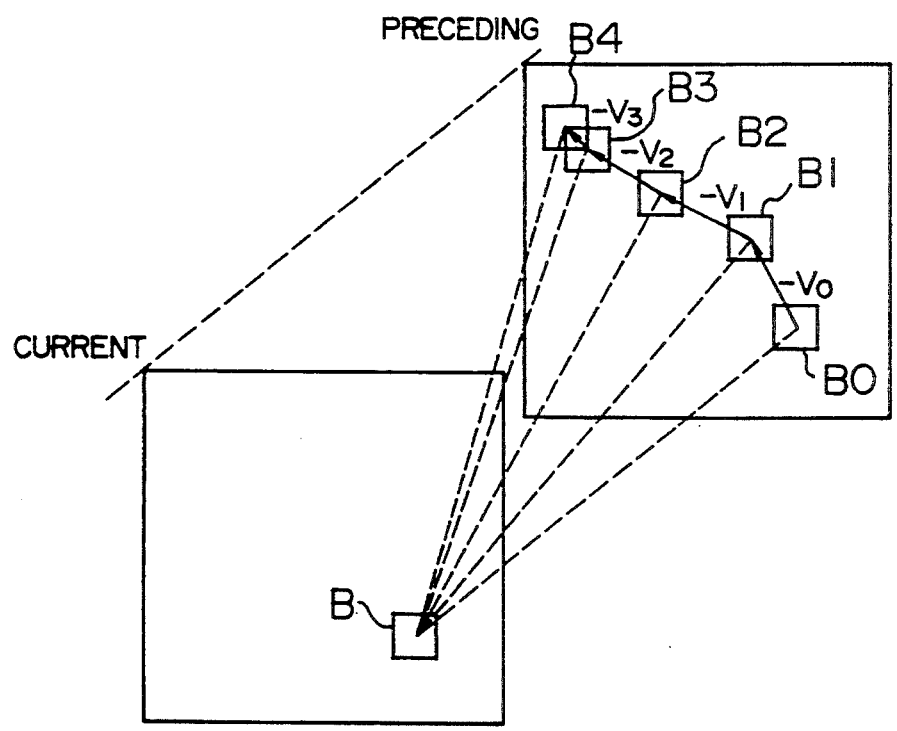
FIG. 8 is a view for illustrating the principle of a recursive block gradient method.

Next, referring to FIG. 6, description will made of a method of checking the reliability of the motion vector determined in accordance with the method described so far.

According to this method, degree of similarity of two pictures represented by functions f(x, y) and g(x, y) is evaluated on the basis of a distance between two points on a coefficient space determined by coefficients obtained from orthogonal function expansion of the functions f(x, y) and g(x, y) or alternatively by using data obtained by standardizing the above-mentioned distance by distances from the origin of the scalar space or the like factor. Considering a block $B_0$ of the preceding field corresponding to a concerned block in the current field and assuming that the two pictures mentioned above represent, respectively, a picture within a block shifted on the basis of the motion vector as detected and a picture of a block $B_4$ of the preceding field for a same object, a high degree of similarity between the two pictures will eventually show that the reliability of the detected vector is high. In other words, the similarity evaluation method can be utilized for checking the reliability of the motion vector. Although a picture is given by a two-dimensional function, it is assumed for simplification of description that the picture is represented by a onedimensional function. Although no limitation is imposed to the orthogonal function in carrying out the invention, it is desirable to adopt a multi-dimensional polynomial expansion for the block of a relatively small size. Let's represent functions of two pictures within a given block (determined by a and b) by f(x) and g(x) (where $a < x < b$), respectively, while representing orthogonal function series by $\phi_k(x)$, then the following expression applies valid.

$$\left. \begin{array}{l} f(x) = \sum_k C_k \phi_k(x) \\ g(x) = \sum_k D_k \phi_k(x) \end{array} \right\} \quad (5)$$

(where $C_k$ and $D_k$ represent orthogonal coefficients, respectively.) Assuming now that the coefficients are available up to a degree of N, two points determined by the coefficients $C_k$ and $D_k$ which correspond to the functions f(x) and g(x), respectively, can be expressed on an N-dimensional space. When the functions representing the two pictures are perfectly identical, the two points on the N-dimensional space coincide with each other, while the distance between the two points on the N-dimensional space increase when difference between the two pictures becomes more significant. Thus, it is possible to use the distance between the two points as the measure of similarity between the two points. Further, by standardizing the above distance with distances to these points from the origin of the N-dimensional space, dispersions of the similarity from one to another picture can be suppressed.

Next, description will turn to a method of determining the coefficients. When the orthogonal expansion can be given by the expression (5), the coefficient $C_k$ and $D_k$ can be determined in accordance with the expressions mentioned below.

$$\left. \begin{array}{l} C_k = \sum_x f(x) \phi_k(x) \\ D_k = \sum_k g(x) \phi_k(x) \end{array} \right\} \quad (6)$$

Description will next turn to a method of determining the degree of similarity. By using the coefficients involved in the orthogonal expansion up to the degree of N, a distance L between the two points on the N-dimensional coefficient space is determined. Namely, $$L = \sqrt{\sum_k (C_k - D_k)^2} \tag{7}$$

Further, the distance between the two points is standardized by the distances from the origin of the coefficient space. The degree of similarity H can be defined by the following expression.

$$H = \frac{\sqrt{\sum_k (C_k - D_k)^2}}{\left\{ \sqrt{\sum_k (C_k^2)} + \sqrt{\sum_k (D_k^2)} \right\}/2} \tag{8}$$

In this way, the degree of similarity between the two pictures or images can be evaluated by taking into account the quantitative components as well.

Description will next be made of operation of the section 7 for determining the degree of similarity between two pictures and checking the reliability of the motion vector on the basis of the similarity as determined. The section 7 includes a ROM for storing orthogonal function series, first to N-th orthogonal coefficient scalers 62-1 to 62-N, summing units 64, 66-1 and 66-2, an adder 67, a divider 68 and an evaluation unit 70. Each of the first to N-th orthogonal coefficient scalers 62-1 to 62-N is supplied with picture signals f(x) and g(x) of two blocks to be checked in respect to the degree of similarity from the current field memory 14-1 and the preceding field memory 14-2, respectively. From the ROM 60, the orthogonal functions stored therein are supplied to the corresponding coefficient scalers 62-1 to 62-N. These coefficient scalers are implemented in a same structure. The coefficient scaler 62-1, for example, includes multipliers 72 and 78, summing units 74 and 78, a subtraction unit 82 and squaring units 76-1, 76-2 and 84. The multipliers 72 and 78 determine products of the input picture signal function f(x) or g(x) and the orthogonal function series $\phi_k(x)$, and the products as determined are summed by the summing units 74 and 80. Thus, upon completion of the processing for one block, the one-dimensional coefficients $C_k$ and $D_k$ will have been determined by the summing units 74 and 80, respectively.

The coefficient $C_k$ is supplied to the squaring unit 76-1 and the subtraction unit 82, while the coefficient $D_k$ is supplied to the squaring unit 76-2 and the subtraction unit 82. In the subtraction unit 82, subtraction of the coefficients is effected, i.e., $(C_k - D_k)$ is determined, the result of which is outputted to the squaring unit 84. The squaring units 76-1, 76-2 and 84 square values inputted thereto, the results of which are outputted to the summing units 66-1, 66-2 and 64. Thus, there are determined the distances to the points on the coefficient space corresponding to the coefficients $C_k - D_k$ from the origin of that space by the summing unit 66-1 and 66-2, respectively. On the other hand, distance between the spatial points corresponding to the coefficients $C_k - D_k$ is determined by the summing unit 64. The contents of the summing units 66-1 and 66-2 are added together by the adder 67 and the resulting sum is supplied to the divider 68. The divider 68 divides the output value of the summing unit 68 by the output value from the adder 67, the result H of the division being outputted to the evaluation unit 70, which then evaluates the degree of similarity between the two pictures on the basis of the output value H from the divider 68 and additionally checks the reliability of the motion vector. In this case, as the two pictures bear closer similarity to each other, the value outputted from the divider 68 becomes smaller, while the value increases as the degree of similarity becomes lower. Since this is in opposition to the generally adopted standpoint, reciprocal of the above-mentioned value may be determined and handled as the value representing the similarity or evaluation value. Alternatively, $(1-H)$ may be handled as the evaluation value, as is apparent from the following description.

An example of the orthogonal function series stored in the ROM 60 will be mentioned. For a domain of definition for the orthogonal polynomial function series given by $0 \leq x \leq m$, a polynomial Pn,m(x) of degree is, for example, defined as follows, wherein represents the degree, represents the number of pixels within a block, and a symbol " " represents powers.

$\phi 0,m(x) = sqr(1/(m+1))$ $\phi 1,m(x) = sqr(12/(m(m+1)(m+2))) \cdot (x-m/2)$ $\phi 2,m(x) = sqr(1/(m(m+1)a2)) \cdot ((x-m/2) \; 2 - (1/12) \cdot m(m+2))$ where $a2 = (1/30)((2m+1)(3m\;2+3m-1)) - (1/12\;2)m(28m\;2+40m+4)$ $\phi 3,m(x) = sqr(1/a3)(x-b3)(x-(b3-c3))(x-(b3+c3-))$ where $a3 = d-e+f-g+h-i+j$ $d = (1/42)m(m+1)(2m+1)(3m\;4+6m\;3-3m+1)$ $e = 6 \cdot b3 \cdot (1/12) \cdot m\;2 \cdot (m+1)\;2 \cdot (2m\;2+2m+1)$ $f = (9 \cdot b3\;2+2s) \cdot (1/30)m(m+1)(2m+1)(3m\;2+3m-1)$ $g = (6 \cdot b3 \cdot s+2t)(\tfrac{1}{4}) \cdot m\;2 \cdot (m+1)\;2$ $h = (6 \cdot b3 \cdot t + s\;2)(1/6)m(m+1)(2m+1)$ $i = 2 \cdot s \cdot t \cdot (\tfrac{1}{2})m(m+1)$ $j = t\;2(m+1)$ $s = 3 \cdot b3\;2 - c3\;e,cir\;2$ $t = b3(b3\;2-c3\;2)$ $b3 = m/2$ $c3 = sqr((u-v)/w)$ $u = (1/30)(2m+1)\;(3m\;2+3m-1)$ $v = (1/16)m\;2(3m+4)$ $w = (1/12)(m+2)$ For m=7 (i.e., eight data) and degree of three, the orthogonal function series is as follows.

$$\phi 0,7(x)=sqr(\tfrac{1}{8})$$

$$\phi 1,7(x)=sqr(1/42)(x-7/2)$$

$$\phi 2,7(x)=sqr(1/168)(x\,2-7x+7)$$

$$\phi 3,7(x)=sqr(1/594)(x\,3-21/2\cdot x\,2+55/2\cdot x-21/2)$$

Next, description will be made of an exemplary embodiment in conjunction with application of a reliability evaluation value as determined to the vector detection. Method of limiting magnitude of recursive vectors in recursive block gradient method As described hereinbefore, according to the recursive block gradient method of determining the motion vector of a picture, the initial displacement vector determined by the pattern matching method is progressively modified so as to reach final determination of the intrinsic motion vector. Consequently, in the recursive block gradient method, although the vector sum as determined gradually approaches to the intrinsic motion vector so long as the displacement vectors determined in the course of the recursive process remain appropriate, the vector sum may diverge when the vector as determined is deviated from the intrinsic displacement vector. In order to prevent such divergence, it is known that magnitude of the displacement vector determined in the course of the recursive process is limited. In this conjunction, the divergence can be prevented by multiplying the displacement vector determined in the recursive process by the reliability representing similarity H determined according to the invention in the form of (1−H). So long as pictures remain the same, the numerical value of (1−H) is "1", meaning that the vector as determined can be employed intact, while for the pictures differing from one to another, the numerical-value of (1−H) becomes close to zero to suppress the divergence.

Method for application to vector allocation

In the vector detecting apparatus, there is usually provided a circuit for making decision as to whether or not the vector as determined is an optimal one. This circuit will herein be referred to as the vector allocation circuit. The vector allocation circuit serves for determining an optimal vector from candidate vectors inclusive of zero vector when a plurality of vectors are determined in a block or from a set of a vector and zero vector when one vector is determined in a block. A conventional method of determining the optimal vector resides in a procedure of calculating a difference between two pictures by moving one picture on the basis of the vector and adopting such vector which minimizes the difference mentioned above. In the procedure of determining the optimal vector, use of the reliability indicating similarity degree H taught by the invention allows the decision as to the optimal vector to be made with higher reliability than the decision based on the inter-picture difference mentioned above.

Application to detection of registration

There has already been developed for practical applications a system for detecting deviation in registration of a television camera from a picture signal obtained upon image pickup of an object. Detection of such deviation can be performed correctly only when the object image is close to monochrome image. Accordingly, it is possible to enhance the accuracy in the registration by allowing the detection of deviation to be performed only when the degree of similarity H is high (close to zero), i.e., when the input picture signal approximates a monochrome signal by detecting the degree of similarity between R-signal component and G-signal component or between B-component and G-component of the input picture signal in accordance with the method taught by the invention.

Finally, referring to FIGS. 9 and 10, description will be made of a picture signal processing system in which the foregoing motion vector detecting apparatus is described foregoing.

Figure 9:
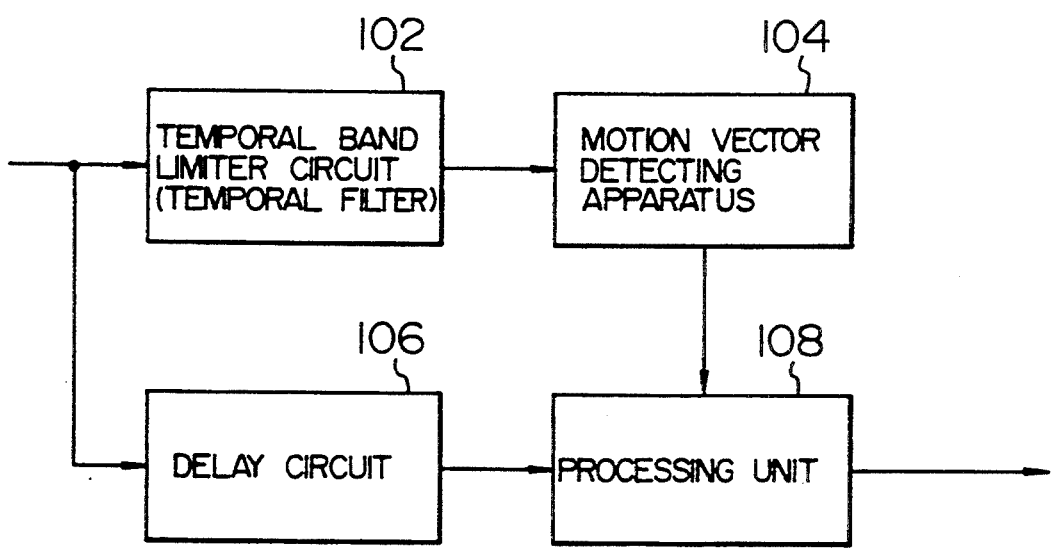
FIG. 9 shows a picture signal processing system according to the present invention.

At first, referring to FIG. 9, the picture signal processing system includes a temporal band limiter circuit 102, a motion vector detecting apparatus 104, a delay circuit 106 and a processing unit 108. The circuit 102 is implemented in a configuration similar to that of the section 2 shown in FIG. 1. The detecting apparatus 104 includes the section 3, 4 and 5 shown in FIG. 1 and may further include the section 6 or 7. The circuit 106 serves for delaying transmission of the picture signal to the processing unit 106 by a time which corresponds to the time required for the operation of the detecting apparatus 104 and includes a plurality of field memories. To this end, the plural field memories of the circuit 102 may be shared by the delay circuit 106. The processing unit 108 performs predetermined processings on the picture signal in accordance with the motion vector detected by the detecting apparatus 104. The predetermined processings may comprise a high efficiency encoding processing such as motion compensating encoding or the like, estimation of three-dimensional motion of an object, system transformation processing between NTSC system of 52 lines/49.96 fields and PAL or SECAM systems of 625 lines/50 fields or between 2-to-1 interlacing HDTV system of 1125 lines/60 fields and 2-to-1 interlacing system of 525 lines/59.94 fields or the like.

Figure 10:
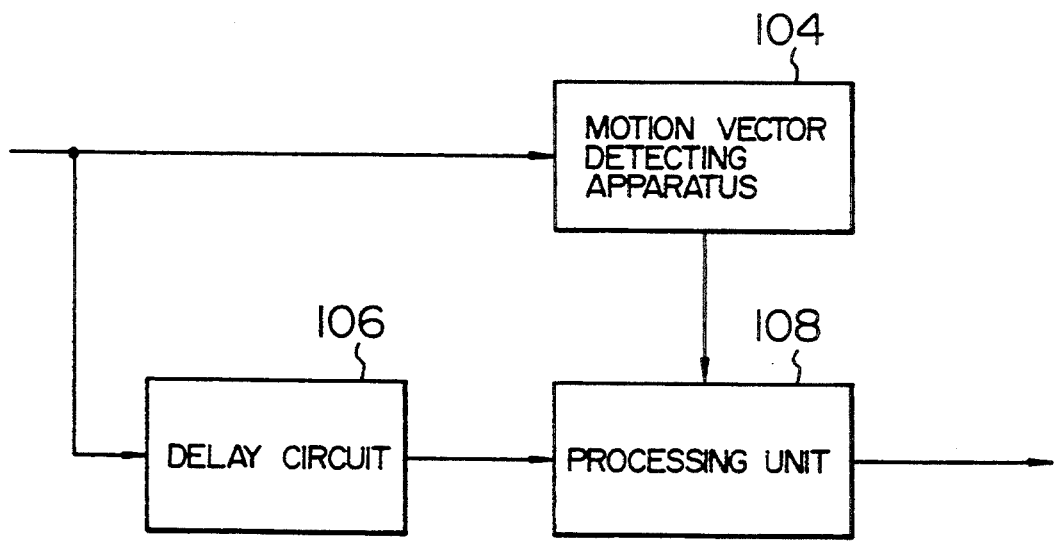
FIG. 10 shows another exemplary embodiment of the picture signal processing system.

A picture signal processing system shown in FIG. 10 differs from the system shown in FIG. 9 only in respect that the circuit 102 is spared. This is because the motion vector can be determined notwithstanding of absence of the circuit 102 in the conventional television cameras which can exhibit the storage effect or the after-image effort.

In the foregoing, the present invention has been described in conjunction with what is presently believed to be a preferred embodiment as well as several applications thereof. It is however apparent that the present invention is never restricted to the illustrated embodiments but numerous modifications and changes may be made without departing from the spirit and scope of the invention as set forth in claims.

We claim:

1. A motion vector detecting apparatus, comprising:
   a memory means for storing first and second picture signals;
   a supplying means for supplying a predetermined value; and
   a detecting means for detecting a motion vector by use of a block gradient method, said detecting means including means for determining a summation of gradients in each of horizontal and vertical directions for a first block of a first picture corresponding to said first picture signal and a summation of level differences between said first picture signal for said first block and a second picture signal for a second block corresponding to said first block, means for adding a predetermined addition minute value to said summation of gradients based on said predetermined value from said supplying means to obtain an added result, and means for determining an element of a motion vector in each of horizontal and vertical directions from said summation of level differences and said added result.

2. A motion vector detecting apparatus as claimed in claim 1, further comprising an applying means for applying an after-image of at least one preceding input picture signal to a following input picture signal to generate said first picture signal and said second picture signal.

3. A motion vector detecting apparatus as claimed in claim 2, wherein said applying means comprises:
a plurality of memory sections for storing a plurality of successive input picture signals, respectively, stored said input picture signals being sequentially shifted;
a weighting means for weighting said input picture signals stored in said plurality of memory sections in accordance with preset coefficients, respectively; and
a summing means for summing weighted said input picture signals from said weighting means to generate said first picture signal and said second picture signal to be supplied to said memory means.

4. A motion vector detecting apparatus as claimed in claim 2, wherein said detecting means includes for each of horizontal and vertical directions:
a means for determining gradients of said first picture signal in a subject horizontal or vertical direction at each pixels within said first block,
a means for adding a predetermined addition value to each of said gradients to obtain an added result and determining absolute values from said added result;
a means for determining level differences between said first and second blocks for pixels in said subject horizontal or vertical direction with signs of the gradient values, for the respective direction;
a summing means for summing said absolute values to obtain an absolute value summation and said level differences, respectively to obtain a level summation; and
a means for determining an element of said motion vector in said subject horizontal or vertical direction by dividing said level summation of said level differences by said absolute value summation of said absolute values.

5. A motion vector detecting apparatus as claimed in claim 1, further comprising an evaluation means for evaluating a reliability of said motion vector, wherein said evaluation means comprises:
a shifting means for shifting said block of said second picture signal corresponding to said first block by said motion vector to obtain said second block;
a means for performing orthogonal transformation of N dimensions for each of said first and second blocks;
a distance means for determining a distance between two points on an N-dimensional space specified by two sets of coefficients obtained by a orthogonal transformation for the first and second blocks; and
a means for evaluating a reliability of said motion vector from a determined distance from said distance means.

6. A motion vector detecting apparatus as claimed in claim 5, wherein said evaluation means further comprises:
a means for evaluating a reliability of said motion vector with a value obtained by normalizing a distance between said two points by distances from an origin of said N-dimensional space to said two points.

7. A motion vector detecting apparatus as claimed in claim 1, further comprising:
an initial displacement vector supply means for supplying an initial displacement, wherein said detecting means detects said motion vector as a first displacement vector from said first and second picture signals and said predetermined value based on said initial displacement vector; and
a means for detecting said motion vector from said initial displacement vector and said detected first displacement vector.

8. A motion vector detecting apparatus as claimed in claim 7, further comprising scene change detecting means for detecting scene change in dependence on a number of said displacement vectors having a magnitude greater than a threshold representing a scene change.

9. A motion vector detecting apparatus as claimed in claim 7, further comprising:
at least one additional detecting means, each having a same construction as said detecting means, each connected in a cascade manner from said detecting means as a first stage so as to construct a plurality of detecting stages each for detecting a stage vector in accordance with a displacement vector supplied from a preceding stage, said first and second picture signals and said predetermined value, for determining a stage displacement vector from said displacement vector supplied from said preceding stage and said stage vector, for outputting said stage displacement vector to a succeeding stage, wherein a first one of said plurality of detecting stages is supplied with said initial displacement vector from said initial displacement vector supply means, while a final one of said plurality of detecting stages outputs a subject said stage displacement vector as said motion vector.

10. A picture signal processing system, comprising:
delay means for delaying an input picture signal by an amount corresponding to a plurality of predetermined time units;
a motion vector detecting section for detecting a motion vector in accordance with a block gradient method based on two renewed picture signals associated with portions of said input picture signal delayed by said delay means and a predetermined addition value to be added to a sum of gradients determined from one of said two renewed picture signals; and
a processing means for performing predetermined processing on said input picture signal delayed by said delay means based on a detected said motion vector from said motion vector detecting section.
wherein said motion vector detecting section includes:
a memory means for storing said two renewed picture signals; and
means for generating two processed signals by applying a spatial band limitation to said two renewed picture signals stored in said memory means, respectively; and a detecting unit for detecting said motion vector in accordance with said block gradient method based on said two renewed picture signals and said predetermined addition value to be added to said sum of gradients determined from a reference signal represented by one of said two renewed picture signals, and wherein said detecting unit includes:
- a means for determining said gradients of said reference signal at each of pixels within a concerned block in X- and Y-directions, each of said renewed picture signals being divided into a plurality of blocks each including a plurality of pixels, said concerned block being one of said plural blocks for which said motion vector is to be detected;
- a means for adding predetermined values to said gradients to obtain an added result and determining absolute values of said added result;
- a means for determining differences in value from said two renewed picture signals at said each pixel in accordance with signs of said gradients in the X- and Y-directions;
- a summing means for summing said absolute values to obtain an absolute sum and said differences in the X- and Y-directions to obtain a differences sum, respectively, for said each pixel within said concerned block; and
- a means for determining values of components of said motion vector by dividing said differences sum of said differences by said absolute sum of said absolute values in the X- and Y-directions.

11. A picture signal processing system as claimed in claim 10, wherein said motion vector detecting section further comprises:
at least one additional detecting units each having a same construction as said detecting unit, each connected in a cascade manner from said detecting unit as a first stage so as to construct a plurality of detecting stages each for detecting a stage vector in accordance with a displacement vector supplied from a preceding stage, said two renewed picture signals and said predetermined addition value, for determining a stage displacement vector from said displacement vector supplied from said preceding stage and said stage vector, and for outputting said stage displacement vector to a succeeding one of said plurality of detecting stages, wherein a first one of said plurality of detecting stages supplies said detected motion vector as an initial displacement vector to a second stage, while a final one of said plurality of detecting stages outputs a subject stage displacement vector as said motion vector.

12. A picture signal processing system as claimed in claim 10, further comprising;
a means for applying at least one of a storage effect and after-image effect during said predetermined time units to said input picture signal delayed by said delay means, for generating said two renewed picture signals to be supplied to said motion vector detecting section.

13. A picture signal processing system as claimed in claim 10, wherein said motion vector detecting section further includes an evaluation means for determining a distance between two points on an N-dimensional space specified by two sets of coefficients obtained by applying orthogonal transformation of degree N (where N is an integer not smaller than 2) to a signal portion of one of said two renewed picture signals as a reference signal corresponding to the a concerned block for which said motion vector has been detected and a signal portion obtained by shifting by said motion vector a signal portion of the other of said two picture signals corresponding to said concerned block, and for evaluating reliability of said motion vector based on said distance.

14. A picture signal processing system as claimed in claim 10, wherein said motion vector detecting section further comprises a scene change detecting means for making a decision in units of blocks as to whether or not said displacement vector supplied from a predetermined one of said plurality of detecting stages is greater than a first predetermined value, for detecting a scene change in dependence on a number of said displacement vectors having magnitude greater than said first predetermined value.

15. An evaluation apparatus for evaluating a similarity of a motion vector, comprising:
- a means for applying orthogonal transformation of N dimensions (where N is an integer not smaller than 2) to first and second blocks of first and second pictures, respectively, said second block being obtaining by shifting a block of said second picture corresponding said first block of said first picture by a motion vector;
- a means for determining a distance between two points on an N-dimensional space specified by two sets of coefficients of said first and second blocks obtained by said orthogonal transformation; and
- an evaluation means for evaluating a similarity between said first block and said second blocks based on data associated with said distance between said two points to obtain a similarity evaluation.

16. An evaluation apparatus as claimed in claim 15, further comprising a means for evaluating a similarity of said first block and said second block based on data obtained by normalizing said distance between said two points by distances from an origin of said N-dimensional space to said two points.

17. An apparatus for detecting deviation in registration by using an evaluation apparatus as claimed in claim 15, wherein two pictures corresponding to primary color signals are handled as said first picture and said second picture with said motion vector of zero for detecting deviation in registration in accordance with a result of said similarity evaluation.

18. A motion vector detecting apparatus, comprising:
- a means for storing motion vectors having been detected for blocks;
- an evaluation apparatus for evaluating a similarity of a motion vector, said evaluation apparatus comprising:.
  - a means for applying orthogonal transformation of N dimensions (where N is an integer not smaller than 2) to first and second blocks of first and second pictures, respectively, said second block being obtaining by shifting a block of said second picture corresponding said first block of said first picture by a motion vector;
  - a means for determining a distance between two points on an N-dimensional space specified by two sets of coefficients of said first block and said second block obtained by said orthogonal transformation; and an evaluation means for evaluating a similarity between said first block and said second block based on data associated with said distance between said two points to obtain a similarity evaluation;

a means for selecting one motion vector from those stored in said storage means in accordance with said similarity evaluation and supplying a selected one motion vector as an initial displacement vector; and a plurality of detecting stages each for detecting a stage vector in accordance with a displacement vector supplied from a preceding stage and said two picture signals for thereby determining a stage displacement vector from said displacement vector supplied from said preceding stage and said vector, said said stage displacement vector being outputted to a succeeding stage, wherein a leading one of said plurality of detecting stages is supplied with initial displacement vector, while a final one of said plurality of detecting stages outputs a subject said stage displacement vector as said motion vectors.

19. A method of detecting a motion vector from picture signals, comprising the steps of:

supplying an initial displacement vector;

detecting a stage vector in a subject stage in accordance with a gradient method on a basis of said initial displacement vector and two input picture signals, wherein said detecting step includes the steps of:

determining gradient values of one of said two picture signals at individual pixels within a concerned block, each of said picture signals being divided into a plurality of blocks each including a plurality of pixels, said concerned block being one of said plural blocks for which said motion vector is to be detected;

adding a predetermined addition value to said gradient values and then determining absolute values thereof;

determining differences in values between said two picture signals at said pixels, respectively, said differences being determined in a direction determined by a directional component of a motion vector to be detected;

summing said absolute values to obtain an absolute sum and said differences to obtain a difference sum, respectively, for all said pixels within said concerned block; and determining said directional component of said motion vector by dividing said difference sum value by said absolute sum value;

determining a displacement vector in said subject stage from said initial displacement vector and a detected said stage vector and outputting said displacement vector of said subject stage to a succeeding stage; and repeating said detecting step and said determining step a number of times corresponding to a number of detecting stages, wherein a leading one of said stages is supplied with said initial displacement vector as said displacement vector, while a final one of said stages outputs a subject displacement vector as said motion vector.

* * * * *